United States Patent [19]

Baucke et al.

[11] Patent Number: 4,762,401
[45] Date of Patent: Aug. 9, 1988

[54] ELECTROCHROMATIC SYSTEM WITH THIRD ELECTRODE

[75] Inventors: Friedrich Baucke, Mainz; Klaus Mücke, Bad Kreuznach; Bernd Metz, Mainz, all of Fed. Rep. of Germany

[73] Assignee: Schott Glaswerke, Mainz, Fed. Rep. of Germany

[21] Appl. No.: 858,959

[22] Filed: May 2, 1986

[30] Foreign Application Priority Data

May 4, 1985 [DE] Fed. Rep. of Germany ....... 3516021

[51] Int. Cl.$^4$ ............................................... G02F 1/01
[52] U.S. Cl. ................................................... 350/357
[58] Field of Search ........................................ 350/357

[56] References Cited

U.S. PATENT DOCUMENTS 4,465,339 8/1984 Baucke et al. ...................... 350/357

Primary Examiner—Gene Wan
Assistant Examiner—James C. Lee
Attorney, Agent, or Firm—Wegner & Bretschneider

[57] ABSTRACT

In an electrochromatic, transparent layer system comprising at least one electrochromatic layer (2), two electrodes (3, 5) separated by a hydrogen ion supplying layer which simultaneously is a hydrogen ion storing layer (4), there is located, seen in the direction of light incidence through the layer system, a further hydrogen ion conducting layer (6) (e.g. of $SiO_2$) behind the electrode (5), behind which a further electrode (7) is arranged. The electrode (7) is capable of oxidizing hydrogen diffusing from within the system into hydrogen ions. For this purpose, a protective voltage is applied between electrode (5) and electrode (7) such that the third electrode (7) forms the positive pole.

6 Claims, 1 Drawing Sheet

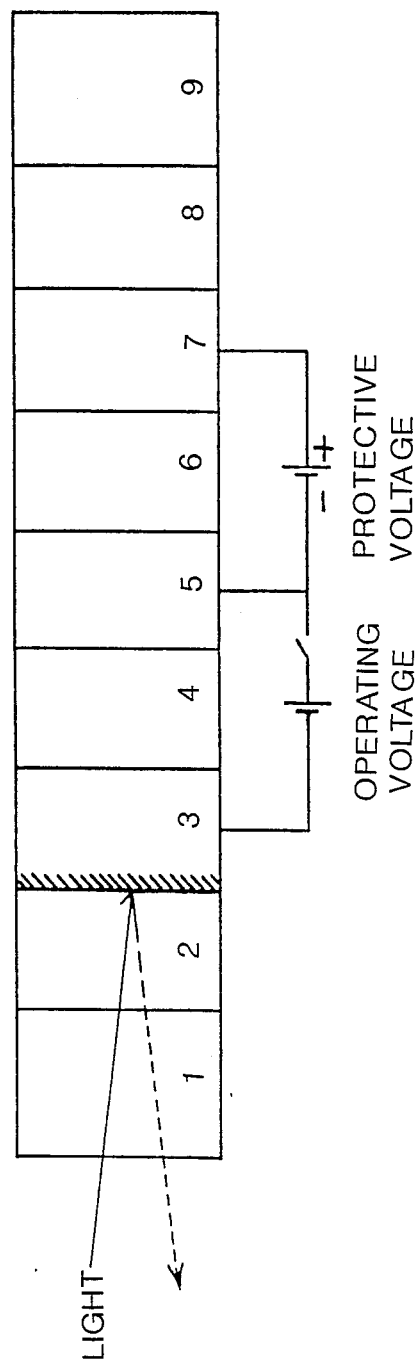

ELECTROCHROMATIC SYSTEM WITH THIRD ELECTRODE

DESCRIPTION OF THE INVENTION

1. Technical Field of the Invention

The invention relates to an improved electrochromatic layer system.

2. Background Art

Electrochromatic layer systems have been increasingly used, inter alia, as mirrors or as displays. For example, DE-PS No. 30 08 768 and corresponding U.S. Pat. No. 4,465,339, the contents of which are incorporated by reference herein, describes an electrochromatic mirror operating with hydrogen ions and generally composed of at least one electrochromatic layer, at least two electrodes separated by a hydrogen-ion conducting layer, and at least one layer supplying hydrogen ions which simultaneously is a hydrogen storing layer. In regard to the exchange of matter into the environment, this mirror represents a hermetically sealed system and contains hydrogen and/or hydrogen ions. The electrochromatic layer generally comprises a molybdenum or tungsten trioxide.

When voltage is applied to the two electrodes, with the electrode located behind the hydrogen ion-supplying layer being positive, protons migrate from this storage layer into the reflector layer, which is connected as an electrode, and are discharged there. The hydrogen formed in this manner diffuses into the electrochromatic layer where it forms the blue tungsten or bronze molybdenum.

This familiar electrochromatic layer system has the disadvantage of more or less quickly losing a portion of the hydrogen contained in it, which is required for tinting the electrochromatic layer. While not wishing to be bound by any theory of the invention, this loss appears due to the fact that oxygen from the outside diffuses into the rear electrode through the adhesive layer between the rear electrode and the glass layer behind it. A corresponding quantity of the hydrogen contained in the system is then oxidized at the rear electrode, a process fostered by the catalytic action of the precious metal electrode.

DISCLOSURE OF THE INVENTION

Accordingly, it is a general object of this invention to provide an electrochromatic layer system operating with hydrogen ions in which the hydrogen loss described above is prevented or greatly reduced.

Another object of this invention is to provide means for applying a protective voltage to such a system to prevent or greatly reduce oxidation of said hydrogen.

An additional object of this invention is to provide such a system wherein the rear electrode simultaneously acts as a cathode with respect to the reflector electrode and as an anode with respect to the protective electrode.

Upon study of the specification and appended claims, further objects, features and advantages of the present invention will become more fully apparent to those skilled in the art to which this invention pertains.

BEST MODE FOR CARRYING OUT THE INVENTION

Briefly, the above and other objects, features and advantages of the present invention are attained in one aspect thereof by providing an electrochromatic transparent layer system comprising at least one electrochromatic layer, at least two electrodes separated by a hydrogen-ion conducting layer, and at least one layer supplying hydrogen ions. In the direction of light incidence, as seen through the layer system, there is arranged behind the second electrode a further hydrogen ion conducting layer and behind this layer a third electrode. A protective DC-voltage is applied between the rear electrode and the additional electrode such that the additional electrode forms the positive pole.

BRIEF DESCRIPTION OF THE DRAWING

In the following a possible arrangement of an electrochromatic mirror according to this invention is described. The electrochromatic mirror can, for example, exhibit the structure represented in the single FIGURE, in which the reference numbers have the following meaning:

1 - glass substrate
2 - electrochromatic layer
3 - hydrogen ion-permeable reflector serving simultaneously as electrode
4 - hydrogen-ion supplying layer
5 - rear electrode
6 - hydrogen ion—conducting layer
7 - an additional third electrode (protective electrode)
8 - adhesive layer
9 - terminating glass pane.

DETAILED DESCRIPTION

As in the familiar electrochemical mirror, the operating voltage is applied between the elctrode 3, shaped as reflector, and the rear electrode 5. In accordance with this invention, a DC voltage is additionally applied between the electrode 5 and a further electrode 7 so that the protective electrode 7 forms the positive pole.

The processes occurring in the layer system of the invention can be interpreted as follows: hydrogen from within the system diffuses through the additional hydrogen ion conductive layer and is oxidized at the additional electrode into hydrogen ions which migrate back to the second (now middle) electrode, forming the negative pole of the protective voltage to be applied according to the invention.

It has been observed that the partial hydrogen pressure at the additional electrode was obviously clearly reduced by the application of the protective voltage. By way of example, the hydrogen pressure $pH_2$ per 30 mV of protective voltage reduces the pressure by a power of ten. 90 mV therefore reduces the $pH_2$ by three powers of ten.

For the additional electrode to be able to cause the oxidation of the hydrogen it must have catalytic characteristics. It preferably is composed of a precious metal, as is prior in the art.

The additional hydrogen ion conductive layer can be any suitable solid electrolyte; preferably this layer consists of metallized $SiO_2$ as described in U.S. Pat. No. 4,465,339.

Without further elaboration, it is believed that one skilled in the art can, using the preceding description, utilize the present invention to its fullest extent. The following preferred specific embodiment is, therefore, to be construed as merely illustrative and not limitative of the remainder of the disclosure in any way whatsoever.

EXAMPLE

In the following one illustrative arrangement of an electrochromatic mirror is described according to the invention. The electrochromatic mirror can, for example, exhibit the structure represented in the FIGURE, in which the reference numbers have the following meaning:

1 - glass substrate
2 - electrochromatic layer
3 - hydrogen ion-permeable reflector serving simultaneously as electrode
4 - hydrogen-ion supplying layer
5 - rear electrode
6 - hydrogen ion—conducting layer
7 - an additional third electrode (protective electrode)
8 - adhesive layer
9 - terminating glass pane.

As in the familiar electrochemical mirror, the operating voltage is applied between the electrode 3, shaped as reflector, and the rear electrode 5. Additionally, a DC voltage is applied between electrode 5 and a further electrode 7 so that the protective electrode 7 forms the positive pole. The rear electrode simultaneously acts as a cathode with respect to the reflector electrode and as an anode with respect to the protective electrode.

The preceding example can be repeated with similar success by substituting the generically or specifically described components of this invention for those specifically used in the example. From the foregoing description, one skilled in the art to which this invention pertains can easily ascertain the essential characteristics thereof and, without departing from the spirit and scope of the present invention, can make various changes and modifications to adapt it to various usages and conditions.

Industrial Applicability

As can be seen from the present specification and examples, the present invention is industrially useful in providing electrochromic mirrors characterized by reduced hydrogen dissipation.

What is claimed is:

1. An electrochromatic transparent layer system hermetically sealed against an exchange of matter with the environment, comprising at least one electrochromatic layer, at least a front and a rear electrode separated by an hydrogen ion conductive layer, and at least one hydrogen ion supplying layer which simultaneously is a hydrogen ion storing layer, characterized by the fact that, seen in the direction of light incidence through the layer system, there is (a) an additional hydrogen ion-conducting layer behind the rear electrode and (b) an additional electrode behind the additional hydrogen-ion conducting layer which is capable of oxidizing diffused hydrogen gas into hydrogen ions.

2. An electrochromatic layer system as in claim 1, wherein the additional hydrogen ion conducting layer is a $SiO_2$-layer which has been applied by metallizing.

3. An electrochromatic layer system as in claim 1, wherein the third electrode is a precious metal electrode.

4. An electrochromatic layer system as in claim 1, wherein a protective DC-voltage is applied between the rear electrode and the third electrode such that the third electrode forms the positive pole.

5. An electrochromatic layer system as in claim 4, wherein the protective voltage is at least 30 mV.

6. An electrochromatic layer system as in claim 4, wherein the protective voltage is at least 90 mV.

* * * * *